United States Patent
Sugaya et al.

(10) Patent No.: US 9,510,573 B2
(45) Date of Patent: Dec. 6, 2016

(54) FISHING ROD WITH TUBULAR FIXING MEMBER

(71) Applicant: GLOBERIDE, INC., Higashi Kurume-shi, Tokyo (JP)

(72) Inventors: Eiji Sugaya, Tokyo (JP); Futoshi Nishikawa, Tokyo (JP); Michinori Ninomiya, Tokyo (JP)

(73) Assignee: GLOBERIDE, INC., Tokyo (JP)

( * ) Notice: Subject to any disclaimer, the term of this patent is extended or adjusted under 35 U.S.C. 154(b) by 0 days.

(21) Appl. No.: 14/345,328

(22) PCT Filed: Aug. 27, 2013

(86) PCT No.: PCT/JP2013/072869
§ 371 (c)(1),
(2) Date: Mar. 17, 2014

(87) PCT Pub. No.: WO2014/034661
PCT Pub. Date: Mar. 6, 2014

(65) Prior Publication Data

US 2015/0296761 A1    Oct. 22, 2015

(30) Foreign Application Priority Data

Aug. 31, 2012 (JP) .................. 2012-191840

(51) Int. Cl.
 *A01K 87/04* (2006.01)
 *A01K 99/00* (2006.01)
(52) U.S. Cl.
 CPC ............... *A01K 87/04* (2013.01); *A01K 99/00* (2013.01)
(58) Field of Classification Search
 CPC .................................................... A01K 87/04
 USPC ............................................................ 43/24
 See application file for complete search history.

(56) References Cited

U.S. PATENT DOCUMENTS

| 2,619,714 A | * | 12/1952 | Dornaus | A01K 87/04 43/24 |
| 3,063,186 A | * | 11/1962 | Ward, IV. | A01K 87/04 43/24 |

(Continued)

FOREIGN PATENT DOCUMENTS

| JP | 10-309153 | 11/1998 |
| JP | 2000-83517 | 3/2000 |
| JP | 2001-161225 | 6/2001 |
| JP | 2003-284455 | 10/2003 |
| JP | 2004-187556 | 7/2004 |

(Continued)

OTHER PUBLICATIONS

International Search Report for PCT/JP2013/072869.

(Continued)

*Primary Examiner* — Marc Burgess
(74) *Attorney, Agent, or Firm* — Pillsbury Winthrop Shaw Pittman, LLP

(57) ABSTRACT

According to an embodiment, there is provided a fishing rod with which a fishing line guide that has a leg portion extending in an extension direction of the fishing rod main body can be mounted on a fishing rod main body in a simple manner. The fishing rod includes a rod-shaped fishing rod main body, a fishing line guide including a leg portion arranged on an outer surface of the fishing rod main body and extending along an extension direction of the fishing rod main body, and a tubular fixing member formed of fiber-reinforced plastic, covering the outer surface of the fishing rod main body and the leg portion, and pressing the leg portion toward the outer surface.

4 Claims, 7 Drawing Sheets

(56) References Cited

U.S. PATENT DOCUMENTS

| | | | | |
|---|---|---|---|---|
| 3,171,229 | A * | 3/1965 | Shobert | A01K 87/04 43/24 |
| 3,400,481 | A * | 9/1968 | Christenson | A01K 87/04 43/24 |
| 3,760,524 | A * | 9/1973 | Butler, Jr. | A01K 87/04 43/24 |
| 4,035,454 | A * | 7/1977 | Klein | A01K 87/04 43/24 |
| 4,142,317 | A * | 3/1979 | Klein | A01K 87/04 43/24 |
| 5,090,150 | A * | 2/1992 | Pirazzini | A01K 87/04 43/24 |
| 5,361,529 | A * | 11/1994 | Lindler | A01K 87/04 43/24 |
| 8,387,302 | B2 | 3/2013 | Akiba et al. | |
| 2013/0192120 | A1 | 8/2013 | Akiba et al. | |

FOREIGN PATENT DOCUMENTS

| | | |
|---|---|---|
| JP | 2011-4651 | 1/2011 |
| JP | 2013-202004 | 10/2013 |

OTHER PUBLICATIONS

Japanese Office Action dated Jan. 19, 2016 for Appln. No. 2012-191840.
Japanese Office Action dated Oct. 20, 2015 for Appln. No. 2012-191840.
European Search Report dated Oct. 21, 2015 for Appln. No. 13834263.9.
Chinese Office Action dated Dec. 3, 2014 for Application No. 201380003256.1.
Taiwanese Office Action dated Oct. 21, 2015 for Application No. 102129919.

* cited by examiner

FISHING ROD WITH TUBULAR FIXING MEMBER

CROSS-REFERENCE TO RELATED APPLICATIONS

This is the U.S. National Stage of PCT/JP2013/072869, filed Aug. 27, 2013, which in turn claims priority to Japanese Patent Application No. 2012-191840, filed Aug. 31, 2012, the entire contents of all applications are incorporated herein by reference in their entireties.

TECHNICAL FIELD

The present invention relates to a fishing rod.

BACKGROUND ART

Japanese Unexamined Patent Application Publication No. 2000-83517 describes a known general structure in which a fishing line guide that has a leg portion which extends in an extension direction of the fishing rod is mounted on a fishing rod. The structure described in Japanese Unexamined Patent Application Publication No. 2000-83517 includes a rod body, a fishing line guide having a fixed portion arranged on an outer surface of the rod body and extending along an extension direction of the rod body, a wound yarn wound around the rod body and the fishing line guide a plurality of times, an epoxy resin impregnated in the wound yarn, and an acrylic urethane resin that is applied over the epoxy resin so as to protect the epoxy resin.

SUMMARY

Technical Problem

However, in the structure disclosed in Japanese Unexamined Patent Application Publication No. 2000-83517, an operation for mounting the wound yarn is not simple but requires proficiency.

According to various embodiments of the present invention, a fishing rod with which a fishing line guide that has a leg portion extending in an extension direction of the fishing rod main body can be mounted on a fishing rod main body in a simple manner is provided.

Solution to Problem

According to an embodiment, there is provided a fishing rod including a rod-shaped fishing rod main body, a fishing line guide including a leg portion arranged on an outer surface of the fishing rod main body and extending along an extension direction of the fishing rod main body, and a tubular fixing member formed of fiber-reinforced plastic, covering the outer surface of the fishing rod main body and the leg portion, and pressing the leg portion toward the outer surface, in which at least one of end surfaces at both axial-direction ends of the fixing member is inclined with respect to a plane orthogonal to an axial direction of the fixing member in a state where the fixing member is not mounted on the fishing rod main body.

According to another embodiment, there is provided a fishing rod including a rod-shaped fishing rod main body, a fishing line guide including a leg portion arranged on an outer surface of the fishing rod main body and extending along an extension direction of the fishing rod main body, and a tubular fixing member formed of fiber-reinforced plastic, covering the outer surface of the fishing rod main body and the leg portion, and pressing the leg portion toward the outer surface, in which the fixing member, in an inner surface thereof, includes a groove extending along the leg portion and accommodating the leg portion at least in part.

According to still another embodiment, there is provided a fishing rod including a rod-shaped fishing rod main body, a fishing line guide including a leg portion arranged on an outer surface of the fishing rod main body and extending along an extension direction of the fishing rod main body, and a fixing member having at least one pressing ring formed of fiber-reinforced plastic and pressing a part of the leg portion toward an outer surface of the fishing rod main body.

Advantageous Effects of Invention

According to various embodiments of the present invention, it is possible to provide a fishing rod with which a fishing line guide that has a leg portion extending in an extension direction of the fishing rod main body can be mounted on a fishing rod main body in a simple manner.

DESCRIPTION OF EMBODIMENTS

Figure 1:
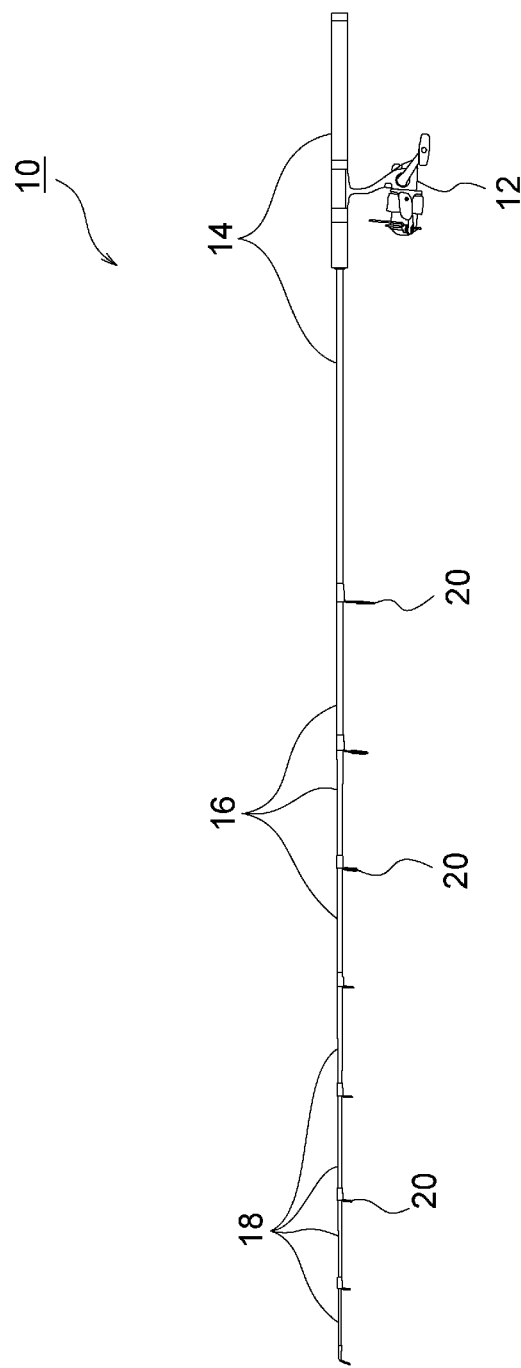
FIG. 1 is a side view illustrating a configuration of a fishing rod according to an embodiment of the present invention.

Hereinafter, various embodiments will be described with reference to the accompanying drawings. The same reference numerals are applied to the same elements in the drawings. In addition, for convenience, each of the drawings may not necessarily be illustrated in the same scale.

FIG. 1 is a side view illustrating a configuration of a fishing rod according to an embodiment of the present invention. As illustrated in FIG. 1, a fishing rod 10 may be a trout rod and a lure rod that may include a base rod 14 on which a reel 12 may be mounted, a medium rod 16 which may be mounted on a tip of the base rod 14, and a top rod 18 which may be mounted on a tip of the medium rod 16. The base rod 14, the medium rod 16, and the top rod 18 may be formed by, for example, winding a fiber-reinforced prepreg sheet in which a reinforced fiber may be impregnated with a synthetic resin around a cored bar and then performing a process such as curing and de-coring. Each of the rods may have either a hollow structure or a solid structure.

One or more fishing line guides 20 may be mounted on each of the base rod 14, the medium rod 16, and the top rod 18. A fishing line that may be pulled out from the reel 12 may be sequentially guided by all of the fishing line guides 20 illustrated in FIG. 1. For convenience of description, the base rod 14, the medium rod 16, and the top rod 18 may be collectively referred to as a fishing rod main body 30.

Figure 2:
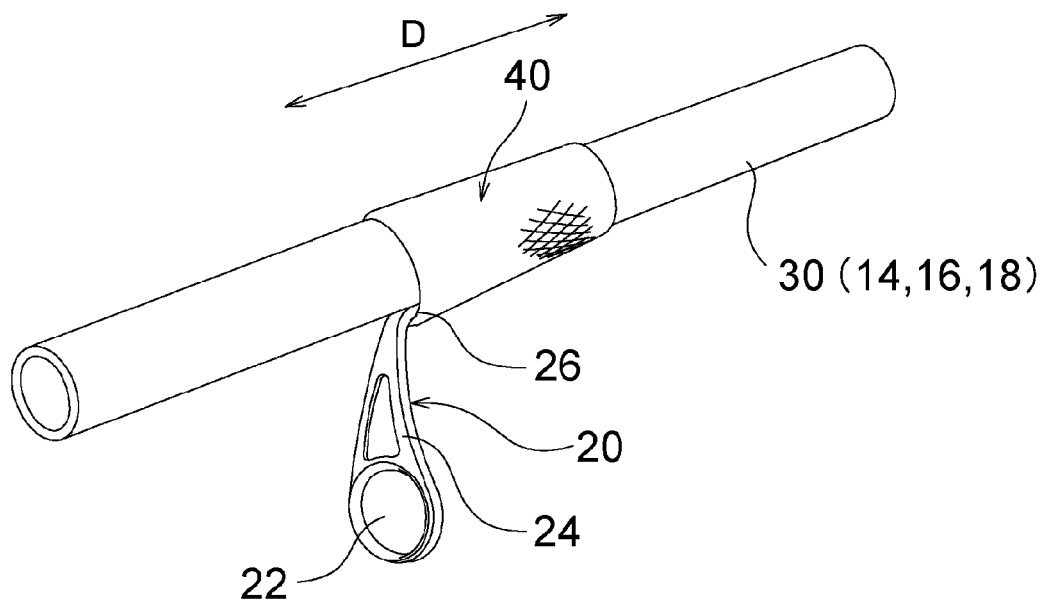
FIG. 2 is an enlarged perspective view illustrating a mounting structure of a fishing line guide of the fishing rod illustrated in FIG. 1.
Figure 3:
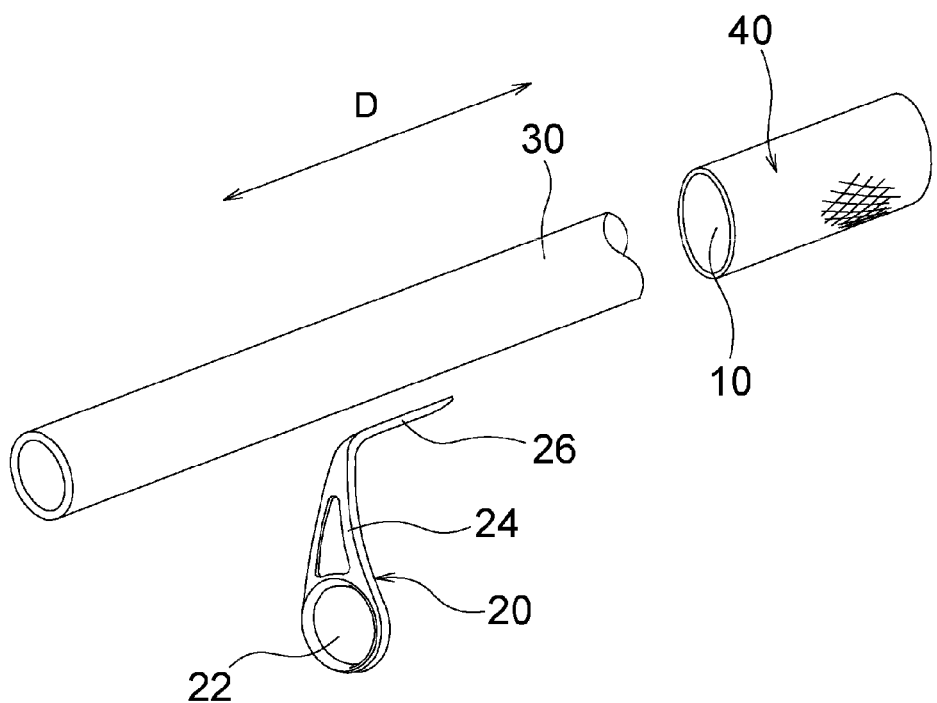
FIG. 3 is an exploded perspective view illustrating the mounting structure illustrated in FIG. 2.

FIG. 2 is an enlarged perspective view illustrating a mounting structure of the fishing line guide 20 of the fishing rod 10 illustrated in FIG. 1, and FIG. 3 is an exploded perspective view illustrating the mounting structure illustrated in FIG. 2. As is illustrated herein, the mounting structure of the fishing line guide 20 of the fishing rod 10 according to this embodiment may have the round rod-shaped fishing rod main body 30 (14, 16, and 18), the fishing line guide 20 that may have a leg portion 26 which may extend along an extension direction of the fishing rod main body 30, and a tubular fixing member 40 which may cover an outer surface of the fishing rod main body 30 and the leg portion 26 of the fishing line guide 20 and may press the leg portion 26 toward the outer surface of the fishing rod main body 30.

A circular through-hole 22 may be formed in the fishing line guide 20, and the fishing line guide 20 may have a plate-shaped main body portion 24 that may extend toward the fishing rod main body 30 while being bent, and the thin plate-shaped leg portion 26 which may be formed in one piece with the main body portion 24 and may extend along the extension direction of the fishing rod main body 30. The fishing line guide 20 may be formed by, for example, pressing and punching a plate that may be formed of a metal, a synthetic resin, or the like into a predetermined shape and bending a predetermined part. Alternatively, the fishing line guide 20 may be formed by, for example, injection molding in which a material such as a metal and a synthetic resin may be used.

The fixing member 40 may be a tubular (tube-shaped) member that may be formed of fiber-reinforced plastic. The fixing member 40 may be formed by winding a plate-shaped fiber-reinforced prepreg (FRP) into a tubular shape. The fiber-reinforced prepreg may be formed by impregnating reinforced fibers (for example, carbon fibers, glass fibers, or the like) with a synthetic resin. In the fiber-reinforced prepreg, the reinforced fibers may have a woven shape as is illustrated, and each of the reinforced fibers may extend obliquely at a predetermined angle (for example, 45 degrees) with respect to an extension direction D of the fishing rod main body 30. This inclination angle can be changed appropriately. In addition, plain-woven, cross-wound, three-axis, and four-axis reinforced fibers and the like can be used as the woven reinforced fiber.

An inner surface of the fixing member can be extended (displaced) to an outer side when subject to an external force directed to the outer side (radial direction of the fishing rod main body 30) since the fixing member 40 is formed of the fiber-reinforced prepreg that may contain the plain-woven reinforced fiber which may extend obliquely with respect to the extension direction D of the fishing rod main body 30. When the external force is released from this state, the inner surface of the fixing member can be contracted (displaced) to an inner side (radial direction of the fishing rod main body 30) without being thermally contracted.

Figure 4:
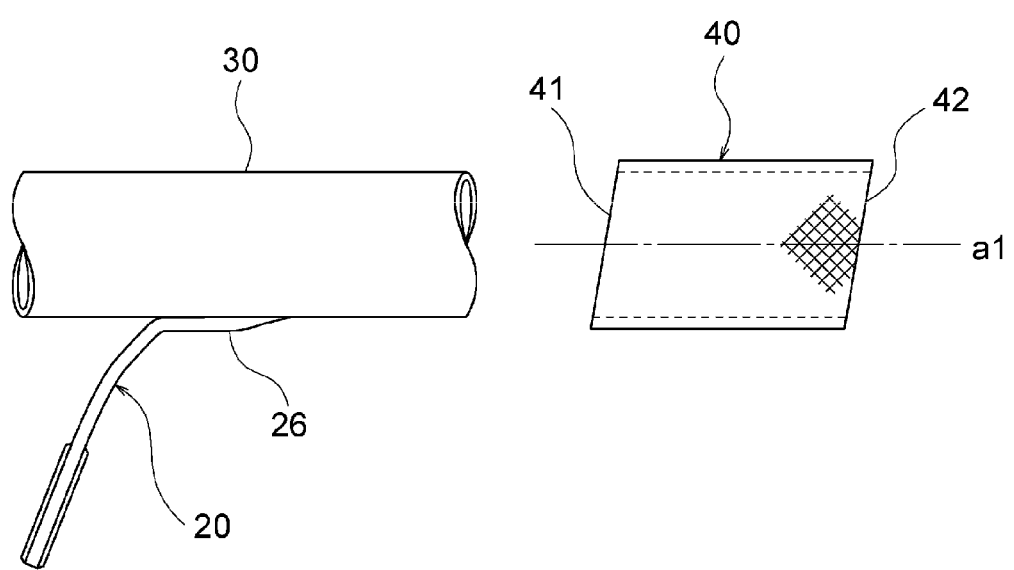
FIG. 4 is an exploded side view illustrating the mounting structure illustrated in FIG. 2.
Figure 5:
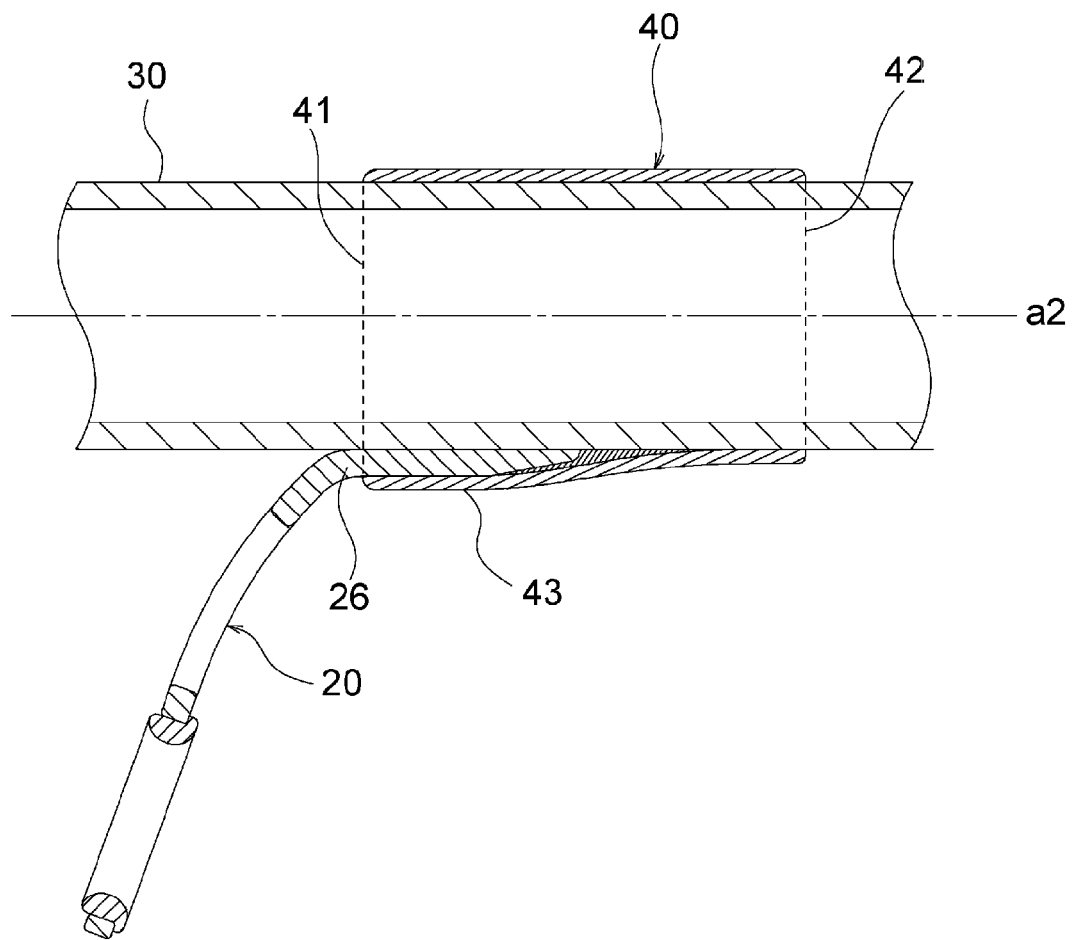
FIG. 5 is a sectional view of the mounting structure illustrated in FIG. 2.

FIG. 4 is an exploded side view illustrating the mounting structure of the fishing line guide 20 illustrated in FIG. 2. As is illustrated, each of end surfaces 41 and 42 at both axial-direction ends of the fixing member 40 may be inclined in the same direction with respect to a plane orthogonal to an axial direction a1 of the fixing member 40 in a state where the fixing member 40 is not mounted on the fishing rod main body 30. FIG. 5 is a sectional view of the mounting structure of the fishing line guide 20 illustrated in FIG. 2. As is illustrated, the end surfaces 41 and 42 may be substantially orthogonal to an axial direction a2 of the fishing rod main body 30 in a state where the fixing member 40 is mounted on the fishing rod main body 30. This may be based on a deformation of an overall shape of the fixing member 40 that may be caused when a pressing portion 43 of the fixing member 40 which may be a part pressing the leg portion 26 of the fishing line guide 20 is pulled to the outer side by a thickness of the leg portion 26. In this manner, the end surfaces 41 and 42 in a state of being mounted on the fishing rod main body 30 can be substantially orthogonal to the axial direction a2 and an external appearance of the fixing member 40 can be made better by inclining the end surfaces 41 and 42 of the fixing member 40 in advance. In addition, a gap may be generated between the outer surface of the fishing rod main body 30 and the inner surface of the fixing member 40 in the vicinity of the end surfaces 41 and 42 when the end surfaces 41 and 42 are inclined with respect to a plane orthogonal to the axial direction a2 of the fishing rod main body 30 in a state where the fixing member 40 is mounted on the fishing rod main body 30 and foreign matter may intrude into this gap to cause the fixing member 40 to be damaged, but this risk may be reduced since the end surfaces 41 and 42 are substantially orthogonal to the axial direction a2. In addition, the inclination angle of the inclination that may be disposed on the end surfaces 41 and 42 of the fixing member 40 can be an appropriate angle, for example, five degrees or less, at which the end surfaces 41 and 42 may be substantially orthogonal to the axial direction a2 in the state of the mounting on the fishing rod main body 30 according to the thickness of the leg portion 26 of the mounted fishing line guide 20.

According to the above-described fishing rod 10 of this embodiment of the present invention, the end surfaces 41 and 42 can be substantially orthogonal to the axial direction of the fishing rod main body 30 in a state where the fixing member 40 is mounted on the fishing rod main body 30 since the end surfaces 41 and 42 at both of the axial-direction ends of the fixing member 40 are inclined in a state where the fixing member 40 is not mounted on the fishing rod main body 30. As a result, the external appearance of the fixing member 40 can be made better and the risk of the damage to the fixing member 40 caused by the generation of the gap can be reduced.

In the fishing rod 10 according to this embodiment, both of the end surfaces 41 and 42 that may be both ends of the fixing member 40 may be inclined. However, there is no problem even when only either one of the end surfaces are inclined.

Next, a fishing rod 10b according to another embodiment of the present invention will be described. A configuration of the fishing rod 10b according to another embodiment other than a fixing member 40b is the same as the fishing rod 10 according to the first embodiment described above, and thus detailed description of the configuration other than the fixing member 40b will be omitted.

Figure 6:
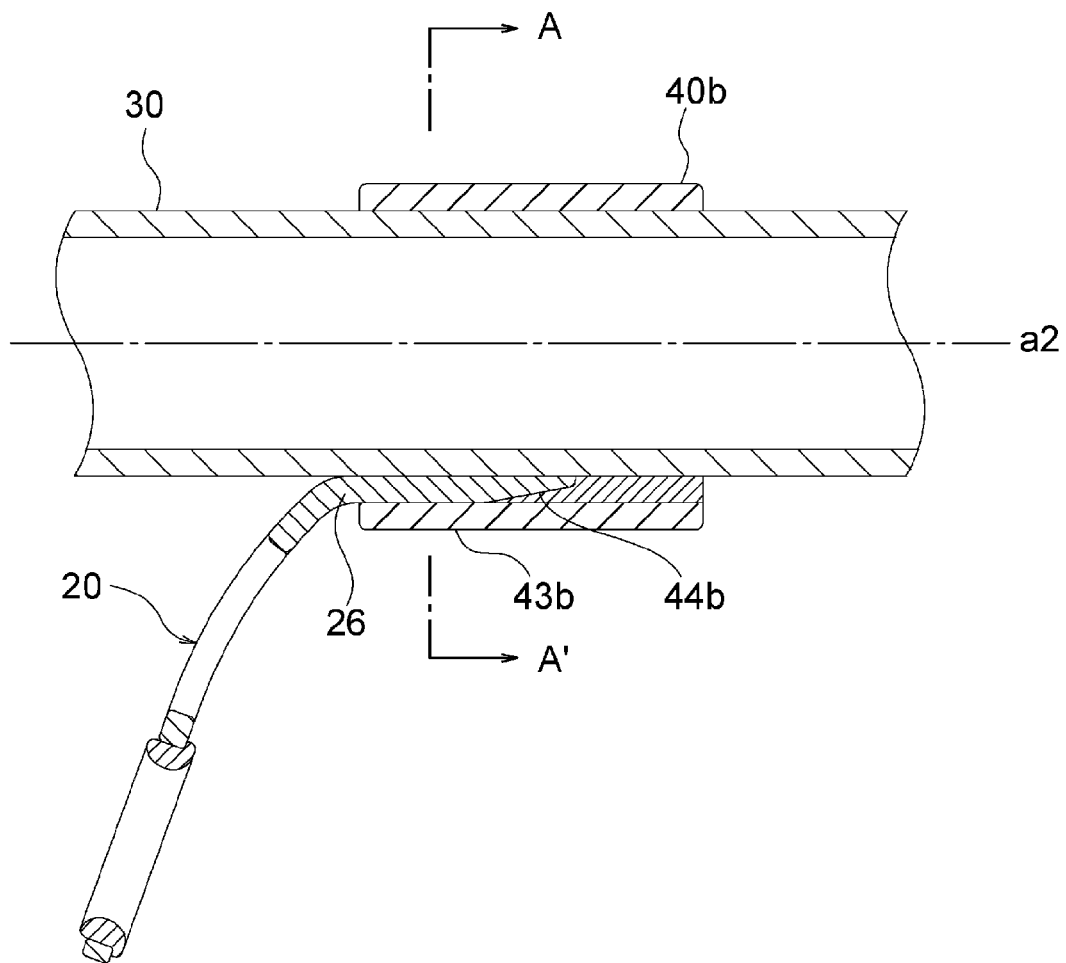
FIG. 6 is a sectional view of a mounting structure of a fishing line guide of a fishing rod according to another embodiment of the present invention.
Figure 7:
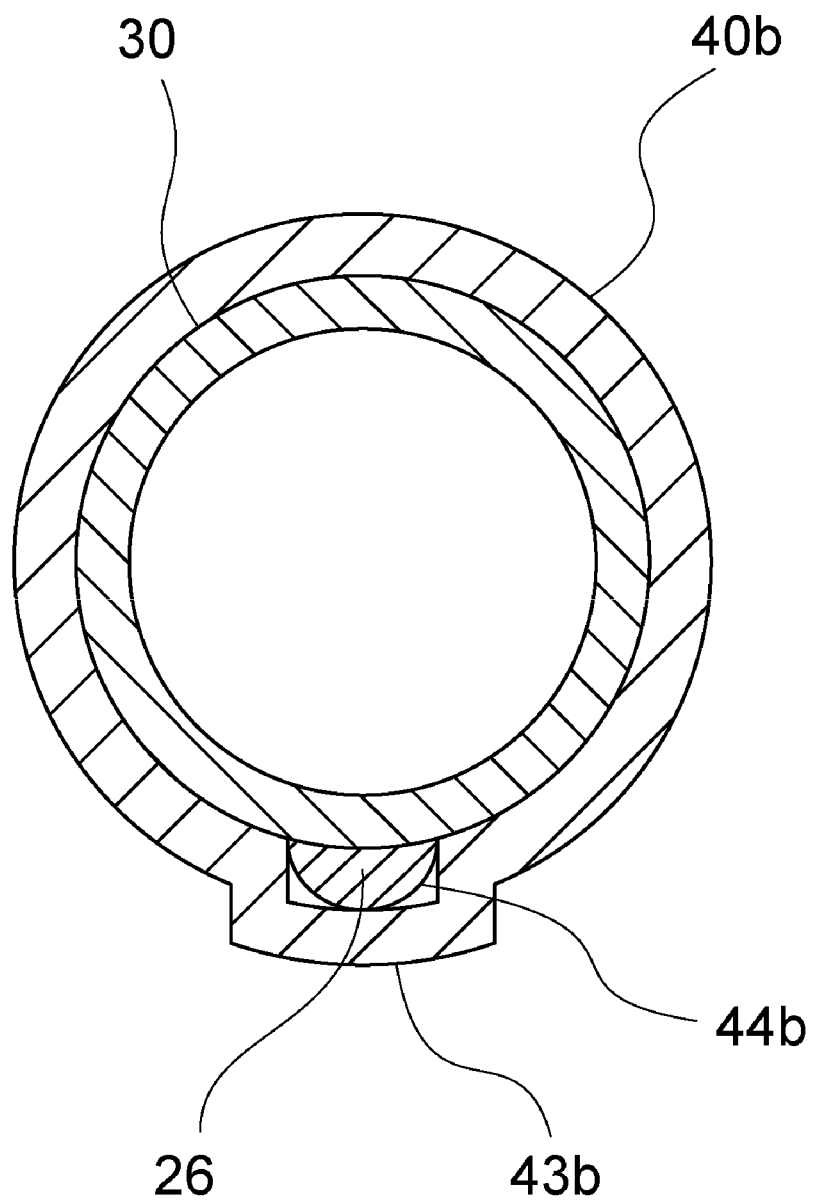
FIG. 7 is a sectional view taken along in A-A' of FIG. 6.

As is the case with the fixing member 40 of the fishing rod 10 according to the first embodiment described above, the fixing member 40b may be a tubular (tube-shaped) member that may be formed of fiber-reinforced plastic, and may be formed by winding a plate-shaped fiber-reinforced prepreg (FRP) into a tubular shape. Properties from the use of the fiber-reinforced plastic may be the same as in the fixing member 40 of the fishing rod 10 according to the first embodiment described above and described already, and thus further detailed description will be omitted. FIG. 6 is a sectional view of a mounting structure of the fishing line guide 20 of the fishing rod 10b according to another embodiment of the present invention, and FIG. 7 is a sectional view taken along in A-A' of FIG. 6. As is illustrated, the fixing member 40b of this embodiment may have an accommodating groove 44b that may accommodate the leg portion 26 of the fishing line guide 20 formed in an inner surface thereof. Since the accommodating groove 44b accommodates the leg portion 26 of the fishing line guide 20, a force at which the pressing portion 43b of the fixing member 40b, which may be a part pressing the leg portion 26, may be pulled to the outer side may be small, and a deformation of an overall shape of the fixing member 40b can be suppressed.

Figure 8:
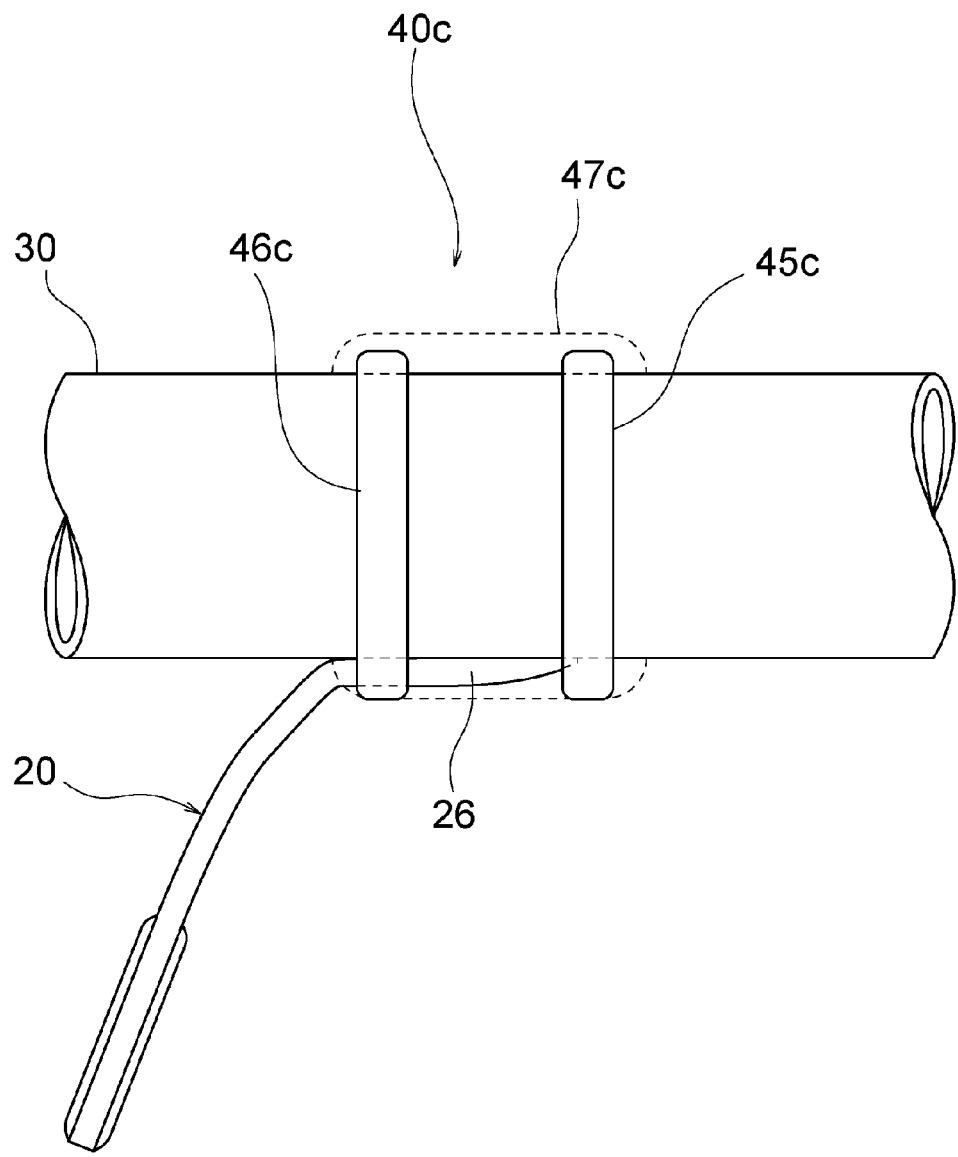
FIG. 8 is a side view of a mounting structure of a fishing line guide of a fishing rod according to still another embodiment of the present invention.

Next, a fishing rod 10c according to still another embodiment of the present invention will be described. As is the case with the fishing rod 10b, the fishing rod 10c according to this embodiment has the same configuration as the fishing rod 10 according to the first embodiment described above excluding a fixing member 40c, and thus detailed description of the configuration other than the fixing member 40c will be omitted. FIG. 8 is a side view of the mounting structure of the fishing line guide 20 of the fishing rod 10c according to this embodiment. As is illustrated, the fixing member 40c of this embodiment may be configured to have two pressing rings 45c and 46c that may press a part of the leg portion 26 of the fishing line guide 20 toward the outer surface of the fishing rod main body 30, and an entire mounting part of the fishing line guide 20 which may have the pressing rings 45c and 46c may be covered by a coating material 47c. The pressing rings 45c and 46c may be formed of fiber-reinforced plastic as is the case with the fixing member 40 of the fishing rod 10 according to the first embodiment described above, and may be formed by cutting the plate-shaped fiber-reinforced prepreg (FRP) wound into a tubular shape. Properties from the use of the fiber-reinforced plastic may be the same as in the fixing member 40 of the fishing rod 10 according to the first embodiment described above and described already, and thus further detailed description will be omitted.

As illustrated in FIG. 8, the pressing ring 45c may be configured to press a tip part of the leg portion 26 of the fishing line guide 20 toward the outer surface of the fishing rod main body 30, and the pressing ring 46c may be configured to press a root part of the leg portion 26 of the fishing line guide 20 toward the outer surface of the fishing rod main body 30. The fixing member 40c of this embodiment may press a part (tip part and root part) of the leg portion 26 of the fishing line guide 20 by using the two pressing rings 45c and 46c, and thus a contact area between the leg portion 26 and the fishing rod main body 30 may be smaller than in a case where a member that may cover the entire leg portion 26 is used for the pressing. Accordingly, a frictional force can be decreased when the fixing member 40c (pressing rings 45c and 46c) is mounted on the fishing rod main body 30 and the mounting can be facilitated. In addition, although the leg portion 26 of the fishing line guide 20 is pressed by the two pressing rings 45c and 46c in this embodiment, the number of pressing rings may not be limited to two but may be one or may be three or more. In addition, an adhesive may be applied to an inner surface of the coating material 47c. In this manner, shifting of the pressing rings 45c and 46c can be prevented.

According to the embodiments of the present invention described above, the fixing member, which may be formed of the fiber-reinforced plastic and may be configured to have a member that can be changed from a state of being displaced to the outer side as the inner surface of the fixing member is subject to the force directed to the outer side to a state of being displaced to the inner side without being thermally contracted as the inner surface is released from the force directed to the outer side, may be used so that the external force directed to the outer side may act on the inner surface of the fixing member, the gap may be generated between the inner surface of the fixing member and the outer surface of the fishing rod main body, the leg portion of the fishing line guide may be arranged in the gap which may be generated in this manner, and then the external force acting on the inner surface of the fixing member may be released and the inner surface of the fixing member may press the leg portion toward the outer surface of the fishing rod main body.

In addition, the fixing member can be formed of a woven material, and thus the gap may be formed during the weaving. When this gap is used, the fixing member may be easily deformed to form the gap between the fishing rod main body and itself so as to arrange the leg portion of the fishing line guide and may be easily deformed to be capable of pressing the leg portion toward the fishing rod main body. Furthermore, the fixing member may be formed to have a thickness of a fiber bundle by the woven material, and thus may be more easily deformed to be capable of the pressing.

The mounting of the fixing member may not require a special proficiency, and the fishing line guide can be simply mounted on the fishing rod main body with required operation time and costs being reduced. In addition, unlike the fishing rod described in Japanese Unexamined Patent Application Publication No. 2000-83517, which is inevitably heavy due to the requirement of two types of resins with different levels of hardness, the fishing rod according to the embodiments of the present invention can be reduced in weight since unnecessary resin is not used. Furthermore, unlike the fishing rod described in Japanese Unexamined Patent Application Publication No. 2000-83517, which is inevitably heavy because the amount of fibers constituting a wound yarn is increased in order to compensate for the tensile strength and elastic modulus of the fibers, the fishing rod according to the embodiments of the present invention does not use the wound yarn itself and thus can be reduced in weight. Moreover, unlike the fishing rod described in Japanese Unexamined Patent Application Publication No. 2000-83517, whose strength is inevitably reduced because the wound yarn wound around the fishing line guide and the fishing rod main body remains extended all the time, the fishing rod according to the embodiments of the present invention does not use the wound yarn itself and thus entails no such problems. In addition, unlike the fishing rod described in Japanese Unexamined Patent Application Publication No. 2000-83517, in which it is difficult to make a difference between an external appearance of a wound yarn part and an external appearance of the fishing rod main body because the wound yarn is wound only along a circumferential direction of the fishing rod main body, the fishing rod according to the embodiments of the present invention can make a difference between the external appearance of the fixing member and the external appearance of the fishing rod main body since the fixing member contains the plain-woven fiber which may extend obliquely with respect to the extension direction of the fishing rod main body, and thus the external appearance of the entire fishing rod can be improved.

In addition, according to the embodiments of the present invention, there is no need at all to thermally contract the fixing member for the change from the state where the inner surface of the fixing member is displaced to the outer side to the state where the inner surface is displaced to the inner side. As such, the external appearance (for example, external appearance of the fiber) of the outer surface of the fixing member is not degraded.

The fishing line guide has been described as having only one leg portion in the embodiments of the present invention, but a fishing line guide having, for example, two leg portions can be fixed to the fishing rod main body. In this case, the fixing member may be arranged to cover each of the two leg portions.

The invention claimed is:

1. A fishing rod comprising:
   a rod-shaped fishing rod main body;
   a fishing line guide including a leg portion mounted on an outer surface of the fishing rod main body and extending along an extension direction of the fishing rod main body; and
   a tubular fixing member configured to accommodate the mounting of the leg portion of the fishing line guide to the fishing rod main body, the tubular fixing member formed of fiber-reinforced plastic with two axially-directed ends that are arranged to cover the outer surface of the fishing rod main body and the leg portion, respectively, and to press the leg portion of the fishing line guide toward the outer surface of the fishing rod main body,
   wherein, prior to mounting, at least one end surface of the fixing member axially-directed ends is configured with an incline relative to a plane orthogonal to the axial direction of the fixing member that operates to facilitate the mounting of the leg portion of the fishing line guide to the fishing rod main body, and
   wherein, upon mounting, the at least one end surface of the fixing member axially-directed ends deforms to be substantially orthogonal to the axial direction of the fixing member to provide secure mounting of the leg portion of the fishing line guide to the fishing rod main body by minimizing gaps between the outer surface of the fishing rod main body and the inner surface of the tubular fixing member such that the fishing line guide is in contact with the outer surface of the fishing rod main body.

2. The fishing rod according to claim 1, wherein the end surfaces at both of the fixing member axially-directed ends are inclined in the same direction relative to the plane orthogonal to the axial direction of the fixing member to facilitate secure coverage.

3. The fishing rod according to claim 1, wherein the fixing member is configured to have a member that can be changed from a state of being displaced to an outer side along the radial direction of the fishing rod main body, as an inner surface of the fixing member along the radial direction of the fishing rod main body is subject to a force directed to the outer side to a state of being displaced to an inner side without being thermally contracted as the inner surface is released from the force.

4. The fishing rod according to claim 3, wherein the fixing member contains a woven fiber extending obliquely with respect to the extension direction of the fishing rod main body.

* * * * *